Oct. 10, 1967     S. R. KOOLNIS     3,346,166
RECLOSABLE DISPENSING CONTAINER WITH LOCKING FLAP
Filed Feb. 27, 1967     6 Sheets-Sheet 1

INVENTOR.
STANLEY R. KOOLNIS
BY
ATTORNEY

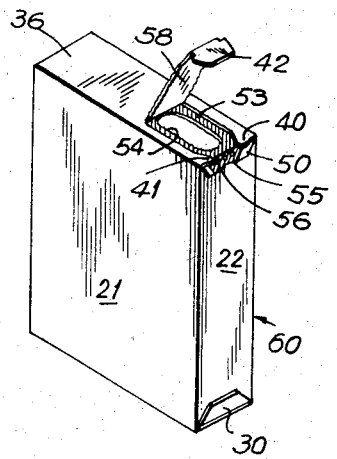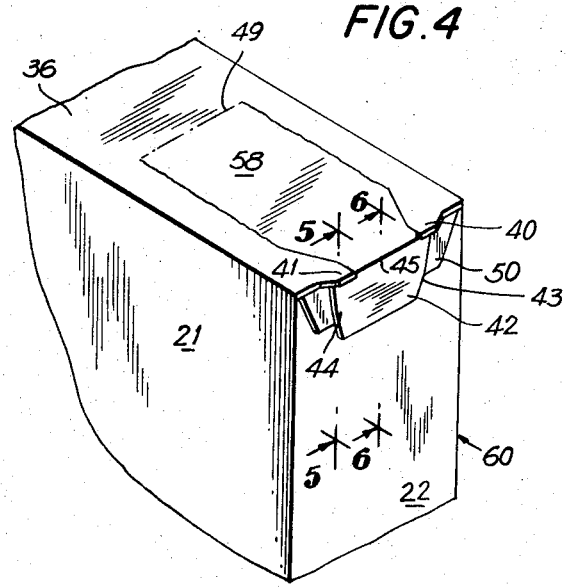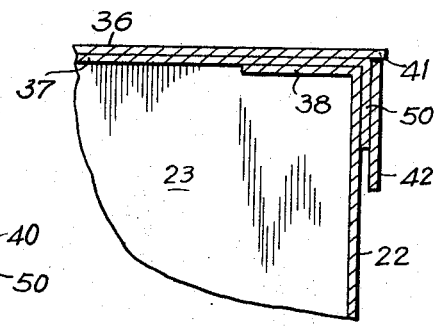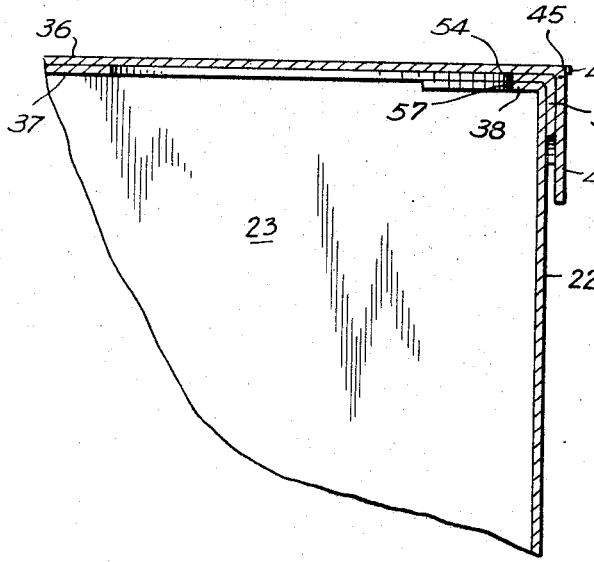

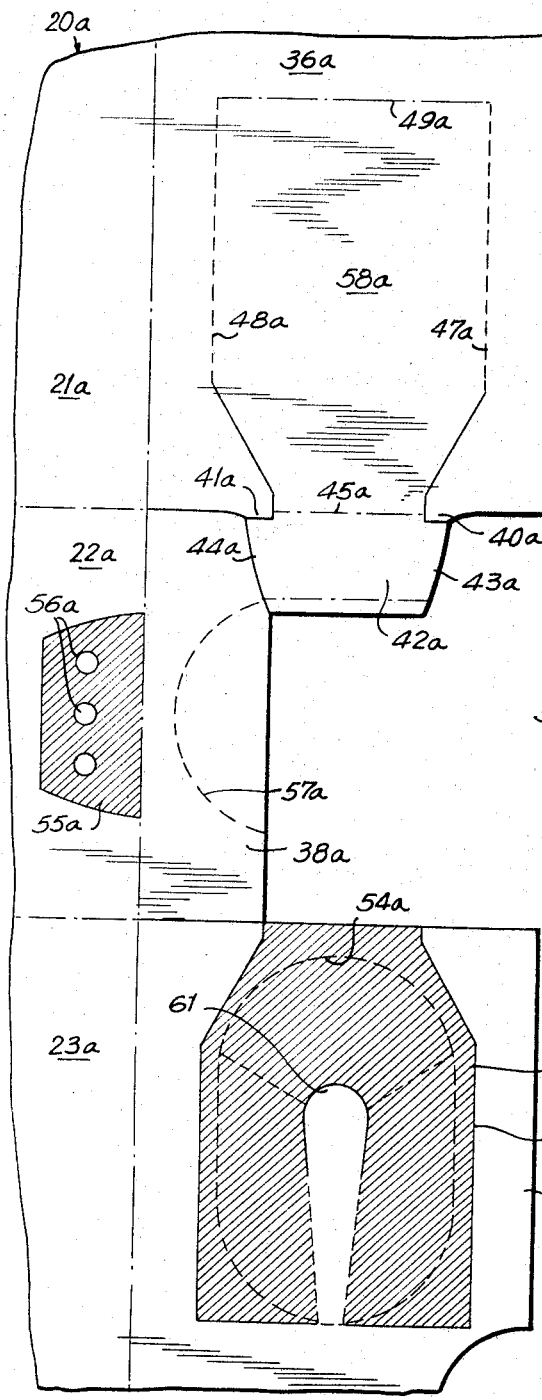
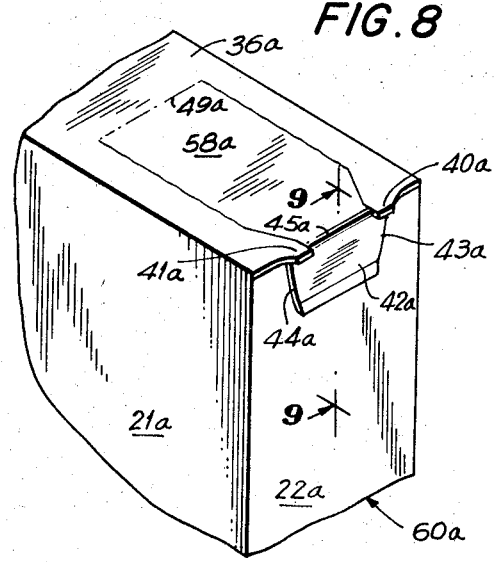
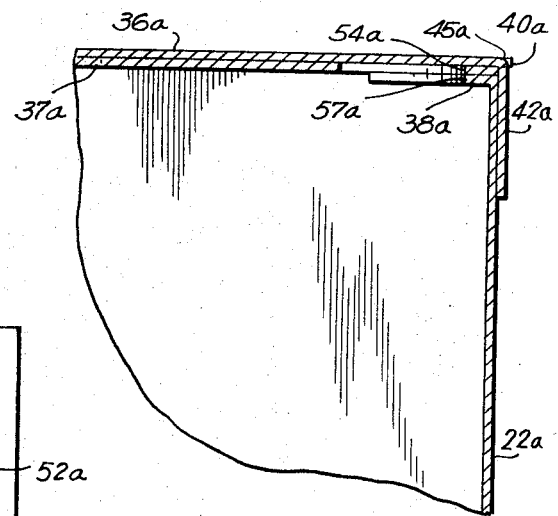

Oct. 10, 1967     S. R. KOOLNIS     3,346,166
RECLOSABLE DISPENSING CONTAINER WITH LOCKING FLAP
Filed Feb. 27, 1967     6 Sheets-Sheet 4

INVENTOR.
STANLEY R. KOOLNIS
BY
ATTORNEY

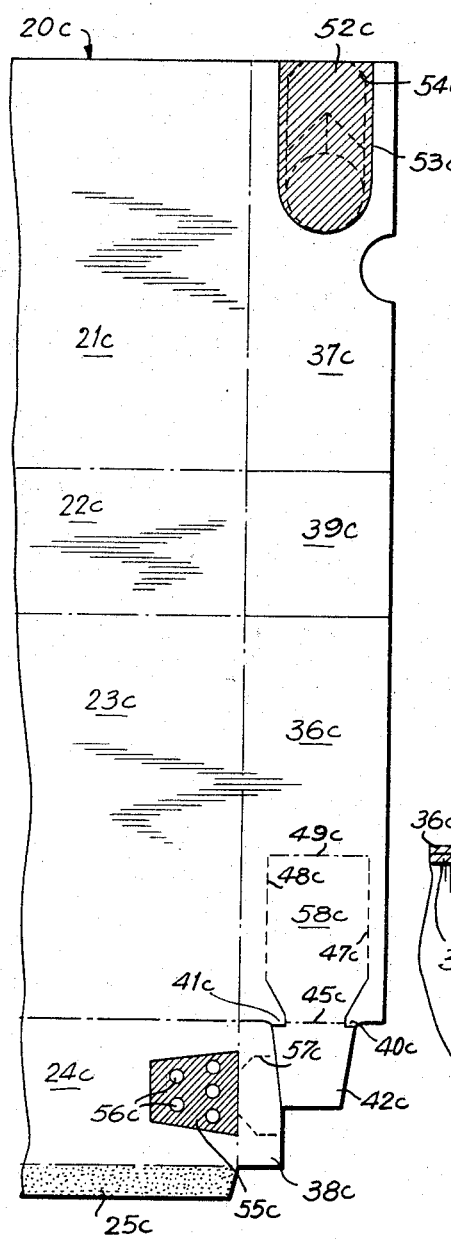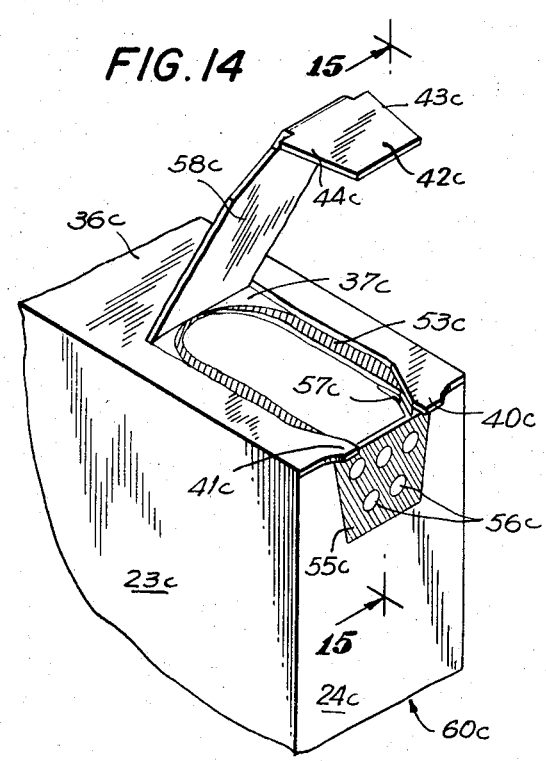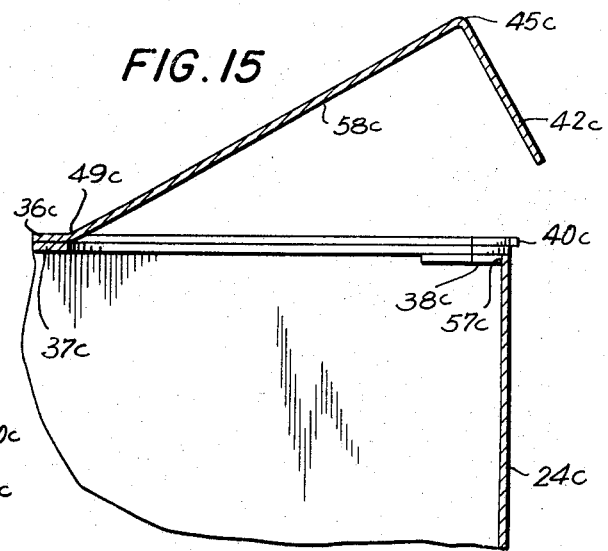

Oct. 10, 1967  S. R. KOOLNIS  3,346,166
RECLOSABLE DISPENSING CONTAINER WITH LOCKING FLAP
Filed Feb. 27, 1967  6 Sheets-Sheet 6

INVENTOR.
STANLEY R. KOOLNIS
BY
ATTORNEY

United States Patent Office 3,346,166
Patented Oct. 10, 1967

3,346,166
RECLOSABLE DISPENSING CONTAINER WITH LOCKING FLAP
Stanley R. Koolnis, New York, N.Y., assignor to Lee Derchsler, Palisades, and Fred Zandell, New York, N.Y.
Filed Feb. 27, 1967, Ser. No. 618,956
18 Claims. (Cl. 229—17)

ABSTRACT OF THE DISCLOSURE

The instant invention discloses essentially a container wherein one wall is provided with an extension tab and severance means for swinging a portion of the wall outward to provide a reclosable opening, and with locking means associated with said tab.

Cross-references to related applications

This application is a continuation-in-part of my copending patent application, Ser. No. 516,058, filed Dec. 23, 1965, and of my co-pending application, Ser. No. 495,272, filed Oct. 12, 1965.

Summary of the invention

It is an important object of the present invention to provide a container construction of the type described which is effectively sealed in its closed condition, being siftproof against granular contents, capable of being quickly and easily opened from its initially sealed condition and readily reclosed to effectively reseal the container.

It is a further object of the present invention to provide a reclosable container of the type described wherein it is positively retained in a reclosed condition even after the initial seal has been broken.

It is still another object of the present invention to provide a reclosable container having the advantageous characteristics mentioned in the preceding paragraphs, which is capable of many varied forms for production on various types of conventional packaging machinery.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Brief description of the drawing

In the drawings:

FIGURE 3 is a perspective view similar to FIGURE 2, but illustrating the container in an opened condition of use;

FIGURE 4 is an enlarged, partial perspective view illustrating the container of FIGURE 3 in its reclosed condition;

FIGURE 5 is a partial sectional elevational view taken generally along the line 5—5 of FIGURE 4;

FIGURE 6 is a partial sectional elevational view taken generally along the line 6—6 of FIGURE 4;

FIGURE 7 is a partial plan view showing a slightly modified form of blank for use in the forming of a reclosable container of the instant invention;

FIGURE 8 is an enlarged partial perspective view similar to FIGURE 4, illustrating a reclosed container formed of the blank of FIGURE 7;

FIGURE 9 is a partial sectional elevational view taken generally along the line 9—9 of FIGURE 8;

FIGURE 13 is a partial plan view illustrating another embodiment of blank for use in practice of the instant invention;

FIGURE 14 is a partial perspective view similar to FIGURE 3, but illustrating an open container formed of the blank of FIGURE 13;

FIGURE 15 is a sectional elevational view taken generally along the line 15—15 of FIGURE 14;

Description of the preferred embodiments

Figure 1:
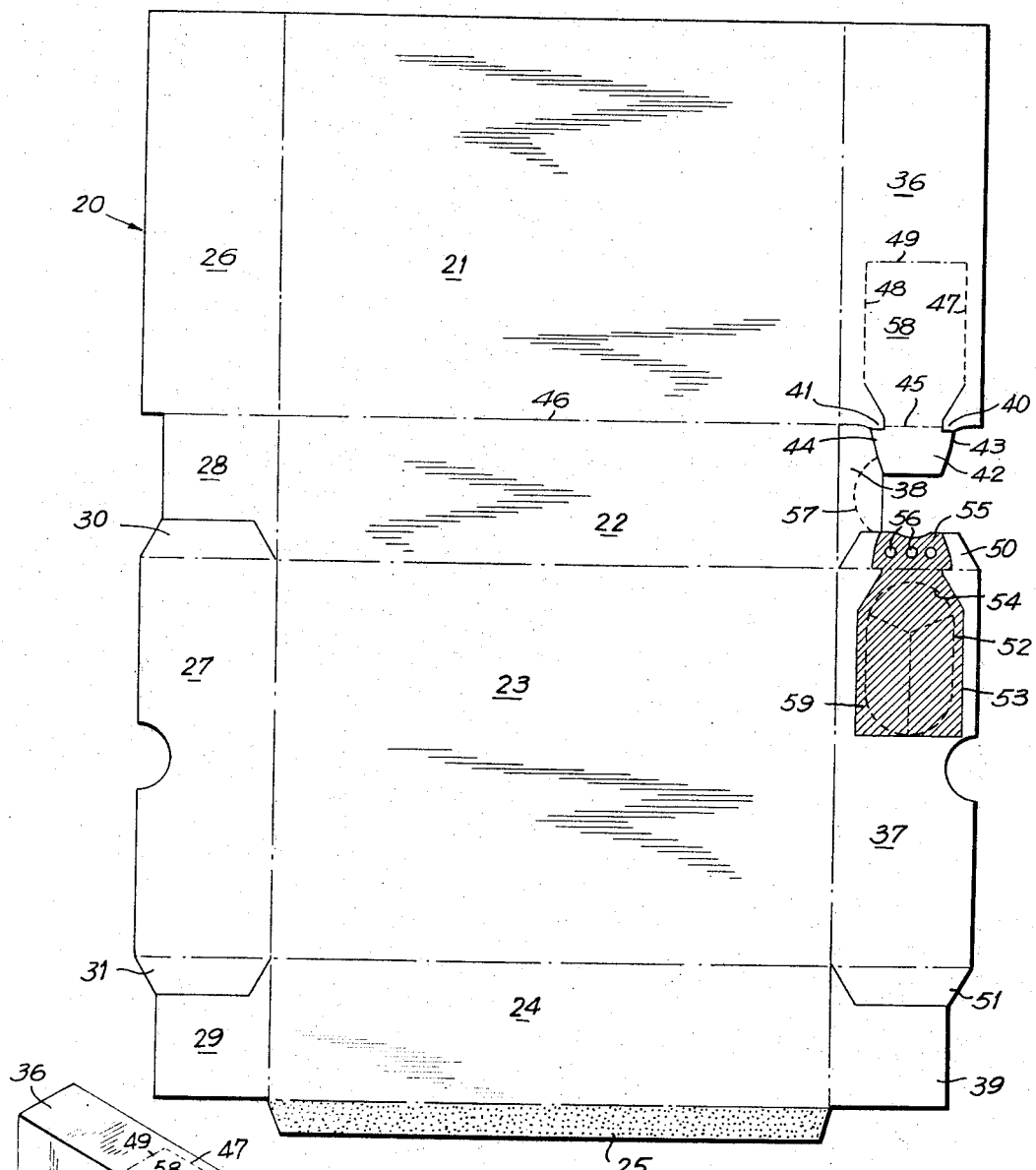
FIGURE 1 is a plan view showing a blank adapted to be formed into a reclosable container in accordance with the teachings of the present invention.

Referring now more particularly to the drawings, and specifically to FIGURE 1 thereof, a blank is there generally designated 20, and may be formed from an integral piece of stiff sheet material, such as paperboard, or the like, including a plurality of generally rectangular, longitudinally coextensive side wall panels 21, 22, 23 and 24, arranged in side by side relation and hingedly connected together, as by fold lines or creases. A glue flap 25 may be provided along the outer edge of an outermost side wall panel, in this instance panel 24, for adhesive securement to the opposite edge portion of the panel 21 in the conventional manner.

Extending from one end of the alternate side wall panels 21 and 23, as by hinged connections thereto, may be respective bottom wall panels 26 and 27, while bottom end flaps 28 and 29 may extend hingedly from the remaining side wall panels 22 and 24. Also, one of the bottom wall panels, say panel 27, may be provided at opposite ends with tabs 30 and 31.

At the opposite ends of alternate side wall panels 21 and 23, extending hingedly therefrom as by fold lines or creases, may be provided top wall panels 36 and 37, respectively. The top wall panels 36 and 37 are each substantially longitudinally coextensive with the adjacent end of the respective side wall panels 21 and 23. Extending hingedly from the remaining side wall panels 22 and 24, intermediate the top wall panels 36 and 37 are a respective tab 38 and flap 39.

The top wall panel 36 is formed at one end with a pair of spaced projections, lips or retainers 40 and 41, which project slightly beyond the adjacent end of the top wall panel 36. Extending between the projections or retainers 40 and 41 is a tab 42, which projects from top wall 36 through the space between and beyond the retainers. Also, the tab 42 includes lateral extensions or wings 43 and 44 extending laterally beyond the space between retainers 40 and 41. The tab 42 is hingedly connected to the top wall panel 36, as by a fold line or crease 45. It will be observed that the retainers 40 and 41 project beyond the extension of hinged connection or fold line 46 between side wall panels 21 and 22, while the fold line 45 is located inward of the top wall panel 36 offset with respect to the fold line 46. Extending into the top wall panel 36 from opposite sides of the tab 42, at opposite ends of the fold line 45, may be a pair of severance lines 47 and 48 which terminate at their inner ends at opposite ends of a fold line or crease 49, the fold lines 45 and 49 and severance lines 47 and 48 combining to bound a portion 58.

The top wall panel 37 may be provided on opposite ends with a pair of tabs 50 and 51, respectively adjacent to and remote from the tab 42. A portion 52 of top wall panel 37 adjacent to tab 50 may be provided on its surface with a coating or layer 53 of material resistant to adhesion, such as varnish, or the like. The panel portion 52 covered by the nonadherent material 53 may be substantially identical to that of the portion 58 of the panel 36. Interiorly of the portion 52 of panel 37, the panel portion may be formed with a closed configuration of severance lines 54. In addition, the tab 50 may be provided on one surface with a coating 55 of adhesion-resistant material, having small areas or spots 56 free of the coating. The tab 38 may be formed with a severance line 57 extending to edges of the tab and conforming to a portion of the severance line 54.

Figure 2:
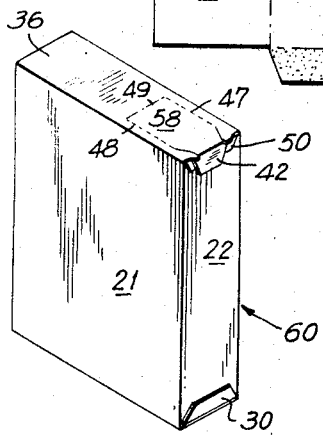
FIGURE 2 is a top perspective view showing a reclosable container, formed from the blank of FIGURE 1, in a sealed condition.

Upon erection or setting up of the blank 20 into a container 60, as seen in FIGURE 2, the side wall panels 21–24 are folded about their hinged connections into a generally rectangular configuration to define side walls 21–24, and the bottom wall panels 26 and 27 are folded into overlying relation and adhesively secured together, as with the flaps 30 and 31 being adhesively secured to adjacent side walls 22 and 24.

Also, the panels 36 and 37 are swung into overlying relation to respectively define outer and inner top walls adhesively secured in facing engagement with each other, see FIGURES 5 and 6. The end tabs 50 and 51 of inner top wall 37 are adhesively secured against the outer sides of respectively adjacent side walls 22 and 24, while the tab 38 is adhesively secured to the underside of inner top wall 37. Also, tab 42 depends along adjacent side wall 22 and is adhesively secured to tab 50, as at the spots 56, for ready detachment therefrom.

Upon detachment of tab 42 from its secured condition of FIGURE 2, the tab 42 may be swung outward and upward between the retainers 41 and 43, and continued pulling may be exercised to effect severance of lines 47 and 48 and folding of portion 58 along fold line 49.

It will now be understood that the portion 58 in the initially sealed condition of FIGURE 2 conformally overlies the non-adhesive-coated portion 52 of inner top wall 37. Thus, opening movement of the portion 58 by swinging about fold line 49 is readily effected. The portion 52 of inner top wall 37 is thereby exposed, and may be opened by severance of any number of the lines 54 to remove a desired portion of the inner top wall material within the portion 52 thus to obtain a variety of opening sizes and shapes as may be desired. Also, it will be observed that the severance lines 54 are spaced inward from the edges of coating 53. The portion 58 thus provides a closure and, in its reclosed condition, seats on a bounding edge or shelf 59 of the portion 52 for effectively sealed reclosure. Also, the inner tab 38 does not interfere with severance along lines 54, as its severance line 57 coincides with a portion of the severance lines 54 for simultaneous removal of a portion of tab 38.

Upon reclosure, it is only necessary to swing the closure portion 58 of outer top wall 36 into facing engagement with the marginal region 59 of inner top wall portion 52, and then swing the tab 42 downward about its hinged connection 45. The location of hinged connection 45, offset inward with respect to fold line 46, effects a snapping action of the wings 43 and 44 past the retainers 40 and 41 to positively retain the tab 42 in its closed condition. In a preferred embodiment of this invention, the hinged connection 45 will be offset, or set back from the fold line 46, a distance at least equal to the thickness of the material from which the container is made.

In the embodiment of FIGURES 7–9, a blank is there generally designated 20a, and includes side wall panels 21a, 22a, and 23a corresponding to panels 21, 22 and 23 of the first-described embodiment. Extending from the panel 21a may be an outer top wall panel 36a substantially identical to the outer top wall panel 36 of FIGURE 1, including a portion 58a bounded by severance lines 47a and 48a, and fold lines 45a and 49a. A pair of spaced lips or retainers 40a and 41a project from the top wall panel 36a on opposite sides of the fold line 45a; and, a tab 42a extends between the retainers 40a and 41a from the fold line 45a, being formed at opposite sides with lateral extensions or wings 43a and 44a.

An inner top wall panel 37a may extend from the side wall panel 23a, being provided on a portion 52a with a coating 53a of adhesion-resistant-material having a configuration corresponding to that of the portion 58a. The portion 52a may be formed with a configuration of severance lines 54a spaced within the portion 52a; and, a central region 61 of the panel portion 52a may remain uncoated for adhesive securement to the underside of portion 58a, substantially completely surrounded by the nonadhesive coating.

The inner top wall panel 37a may omit end tabs, and the side wall panel 22a may be provided with a coating 55a of non-adhesive material, having uncoated completely surrounded areas or spots 56a. The side wall panel 22a may include an extension or tab 38a having a severance line 57a, essentially similar to that of FIGURE 1.

Upon erection of the container 60a from the blank 20a of FIGURE 7, the portion 58a overlies the coated portion 52a, the uncoated central area 61 being adhesively secured to the former. Also, the tab 42a is adhesively secured overlying the side wall 22a, as by the detachable securement at spots 56a. Upon opening of the closure portion 58a, in the same manner as in the first-described embodiment, the closure is swung about its inner fold line 49a, and, in the instant embodiment, effects swinging movement of the adhesively secured underlying portion 61 to effect an initial opening in the inner top wall panel 37a of the container 60a. Additional opening of the container, if desired, may be effected by severance along the lines 54a.

Figure 10:
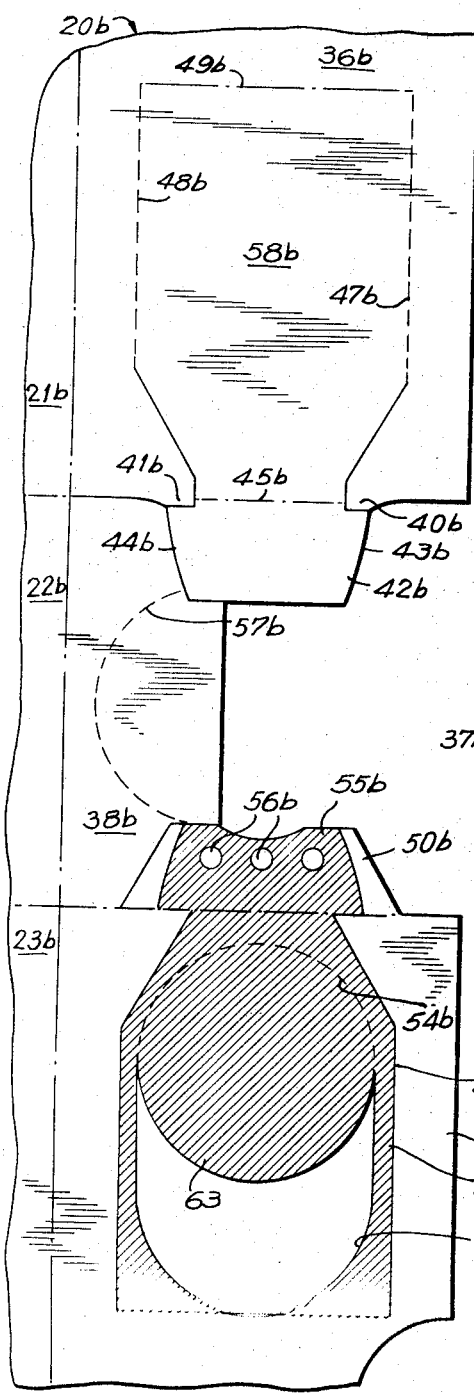
FIGURE 10 is a partial plan view showing another embodiment of blank of the present invention for use in forming a reclosable container.
Figure 11:
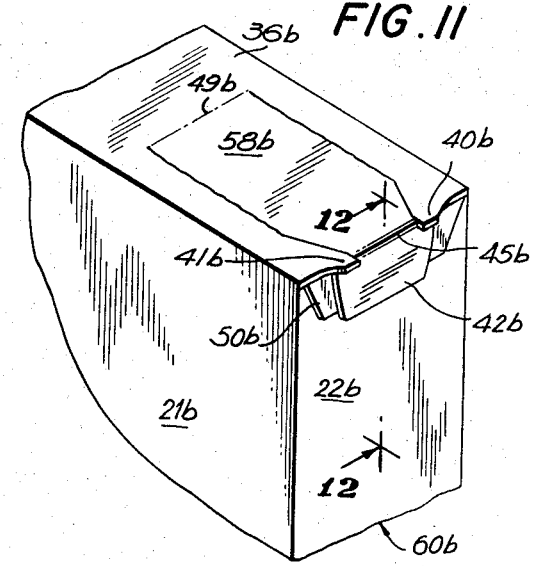
FIGURE 11 is a partial perspective view illustrating a reclosed container formed from the blank of FIGURE 10.
Figure 12:
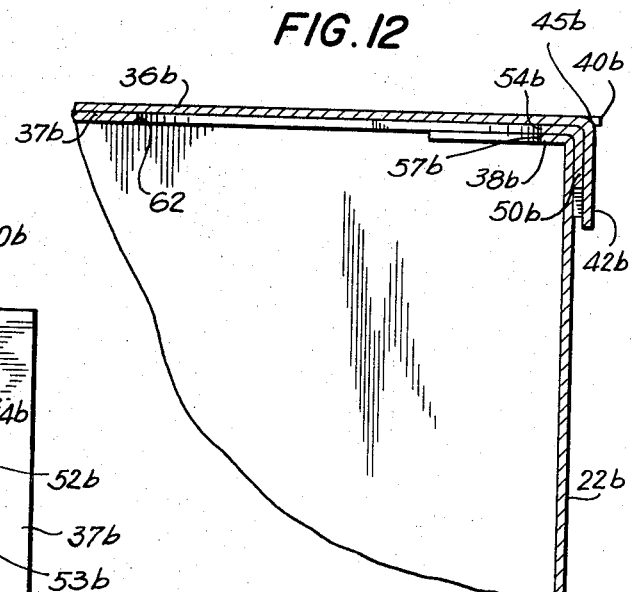
FIGURE 12 is a partial sectional elevational view taken generally along the line 12—12 of FIGURE 11.
Figure 16:
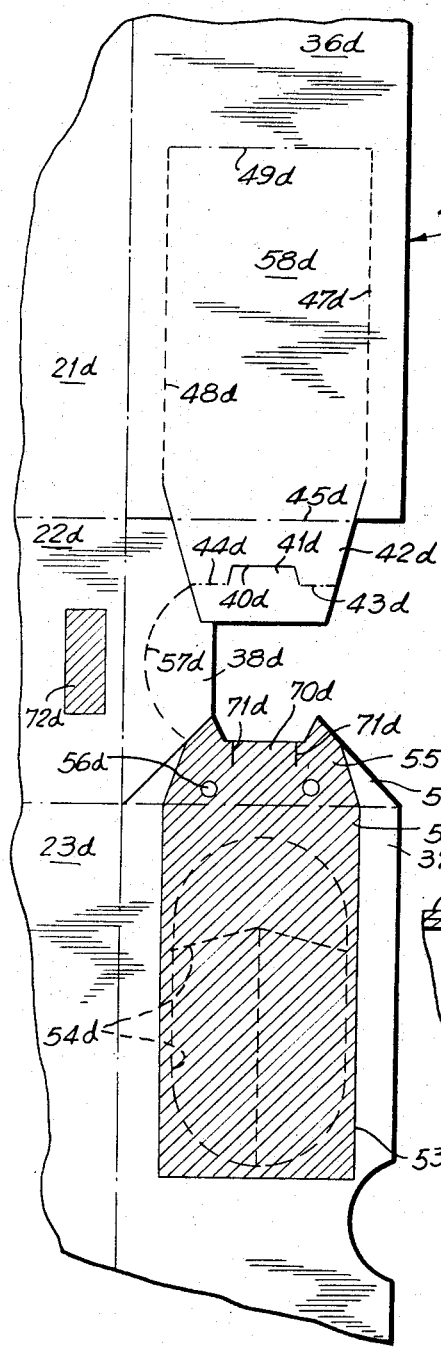
FIGURE 16 is a partial plan view showing still another slightly modified form of blank for use in forming a reclosable container in accordance with the teachings of the present invention.

Referring now to the embodiment of FIGURES 10–12, a blank is there generally designated 20b, including side panels 21b, 22b and 23b. An outer or upper end panel 36b extends from side panel 21b, substantially identical to the previously described panels 36a and 36. Extending from the adjacent end of side panel 22b is a tab 38b, which may be essentially similar to tab 38, including a severance line 57b similar to the severance line 57.

Extending from and hingedly connected to the panel 23b is an inner top panel 37b.

The outer top panel 36b includes a closure portion 58b essentially the same as the portion 58a and portion 58 of the previously described embodiments, and is further provided with a tab 42b similar to the tabs 42a and 42.

The inner top wall panel 37b includes a portion 52b configured to conformably underlie the portion 58b and covered with a coating of adhesion-resisting material 53b. In spaced relation within the portion 52b there is formed a severance line 54b, while a part of the portion 52b is cut away, as at 62, leaving only a generally circular or otherwise specifically configured part 63 removable upon severance of line 54b. The part 63 may be marked to define a token or check, as for redemption or other use.

A tab 50b extends from an end of inner top wall panel 37b and is provided with a coating 55b of adhesion-resisting material, having uncoated spots or areas 56b.

Upon setup of the box 60b from the blank 20b, the tab 42b is initially detachably secured to the tab 50b, and upon detachment therefrom may be swung upward, together with closure 58b to expose the token 63 for removal, thus also to provide for a suitable pour opening in the inner top wall panel 37b.

The embodiment of FIGURES 13-15 employs a blank 20c including side wall panels 21c, 22c, 23c and 24c. Extending from alternate side wall panels 21c and 23c are inner and outer top wall panels 37c and 36c, respectively. An end flap 39c may extend from the upper end of side wall panel 22c, and a tab 38c may extend from the upper end of side wall panel 24c.

The outer top wall panel 36c may be substantially identical to the outer top wall panels 36b, 36a and 36. However, it will be observed that the panel 36c is hingedly connected to an intermediate side wall panel 23c, rather than the distal side wall panel 21c.

Also, the inner top wall panel 37c may be essentially similar to the inner top wall panels 37b, 37a and 37, but is hingedly connected to the distal side wall panel 21c.

Further, the side wall panel 24c may be essentially similar to the previously described side wall panel 22a having a non-adhesive coating 55c provided with uncoated spots 56c for detachable securement thereto of the tab 42c of closure portion 58c. The tab 38c may be formed with a severance line 57c adapted to partially conformably underlie the removable portion 52c of inner top wall panel 37c.

Upon erection of blank 20c into a container 60c, it will be seen that the outer top wall 36c overlies the inner top wall 37c, with the inner top wall portion 52c specifically underlying the portion 58c of the outer top wall 36c, and exposed for removal upon opening of the closure portion 58c. The rearrangement of inner and outer top wall panels in the embodiment of FIGURES 13-15 illustrates one of the many possible variations of the instant invention for use on different types of conventional box-making machinery.

Referring now to the embodiment of FIGURES 16-19, a blank is there generally designated 20d, and includes side wall panels 21d, 22d and 23d. Extending from the panel 21d may be an outer top wall panel 36d similar to the outer top wall panel 36, including a portion 58d bounded by severance lines 47d and 48d, and fold lines 45d and 49d. A tab 42d extends from the fold line 45d beyond the wall panel 36d, and is formed with a generally U-shaped cut 40d having its bight region spaced from and extending toward the fold line 45d. The cut 40d bounds a tab portion 41d, and a pair of aligned fold lines 43d and 44d extend oppositely outwardly away from respective ends of the U-shaped cut 40d.

An inner top wall panel 37d may extend from the side wall panel 23d, being provided on a portion 52d with a coating 53d of adhesion-resistant material having a configuration generally corresponding to that of portion 58d. The portion 52d may be formed with a configuration of severance lines 54d spaced within the portion 52d, for selective severance and removal of the bounded regions.

A tab 50d extends from an end of the inner top wall panel 37d and is provided with a coating 55d of adhesion-resisting material, having uncoated spots or areas 56d. Also, the tab 50d may have its outer end cut away, as at 70d, the cutout being provided with a pair of laterally spaced inwardly extending cuts or slits 71d.

The side wall panel 22d may be provided with a coating 72d of nonadhesive material; and, there may be an extension or tab 38d on the panel 22d having a severance line 57d.

Figure 17:
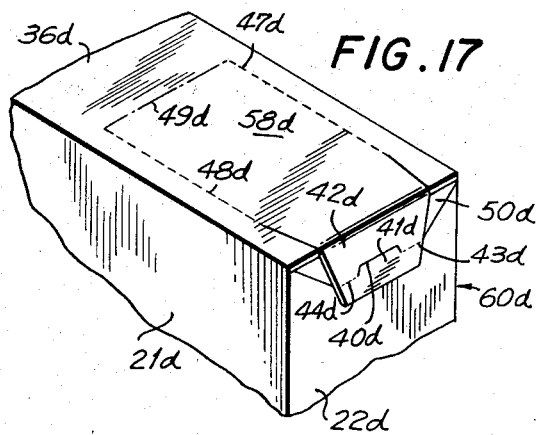
FIGURE 17 is a partial perspective view illustrating a corner of a sealed container formed from the blank of FIGURE 16.
Figure 18:
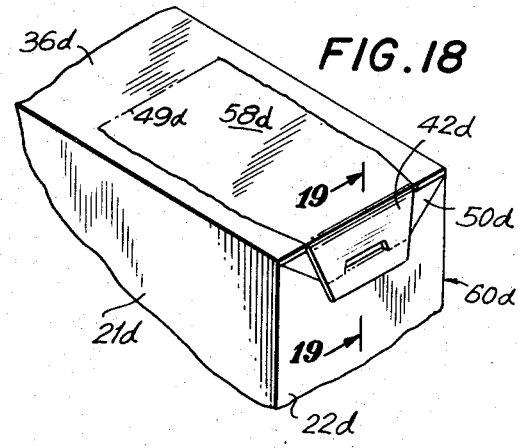
FIGURE 18 is a partial perspective view showing the container of FIGURE 17 having been opened and reclosed.
Figure 19:
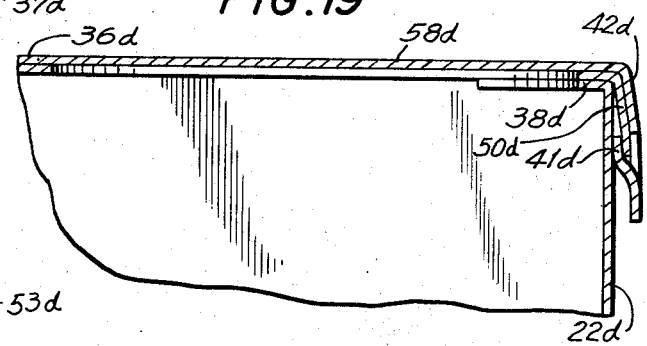
FIGURE 19 is a sectional elevational view taken generally along the line 19—19 of FIGURE 18.

Upon erection of the container 60d from the blank 20d, see FIGURES 17-19, the portion 58d overlies the coated portion 52d for nonadhesion thereto. The tab 50d overlies the side wall 22d, being adhesively secured thereto, except over the region of adhesion-resistant material 72d. Further, the tab 42d is adhesively secured overlying the tab 50d, as at the uncoated areas 56d, for convenient detachment therefrom. This condition is seen in FIGURE 17.

The outer or distal end of tab 42d may be grasped and pulled to destroy the adhesive connection to tab 50d, and upon continued upward swinging movement of tab 42d the closure portion 58d is opened by severance along lines 47d and 48d. Access to the interior of the container 60d is effected by severance along one or more of the lines 54d to define a dispensing opening.

Reclosure of the container 60d is quickly and easily effected by return swinging of the closure portion 58d into the plane of outer top wall 36d. Further, the closure portion 58d may be effectively locked in its closed condition by engagement of the catch portion 41d within U-shaped cut 40d of tab 42d beneath the cutout edge 70d of tab 50d. That is, the tab 42d may be swung or folded along its fold lines 43d and 44d to displace the catch 41d toward the side wall 22d. The catch 41d may readily engage beneath the cutout edge 70d, as the adjacent portion of tab 50d remains unsecured to the adjacent facing portion of wall 22d by virtue of the coating 72d. This condition is shown in FIGURES 18 and 19. Of course, the container 60d may be repeatedly opened and closed indefinitely.

It will be obvious that the portion 52d may be formed with a configuration of severance lines like 54 in FIGURE 1, 54a in FIGURE 7, 54b in FIGURE 10 or 54c in FIGURE 13.

Further, it will be appreciated that, particularly with regard to the embodiment of FIGURES 16-19, in the initial sealing of the container 60d the catch portion 41d may be engaged beneath the cut-out edge 70d. This may be done by providing means, as part of the filling and sealing machinery, for flexing the tab 42d along the fold lines 43d and 44d, thus to displace the catch 41d simultaneous with the folding of the flap 42d along the fold line 45d and thereby facilitate an initial sealing of the container which, except for the adhesive securement and the unbroken perforated lines, will appear substantially the same as it would after use and reclosing as heretofore described.

The advantage obtained would be that the consumer would have no difficulty in understanding the operation for reclosing of the container. It is obvious that less difficulty would be encountered in educating the user than if the package were opened in one manner and reclosed in another.

Also, it will be seen that other variations of this invention may be obtained by making different combinations of the various features herein disclosed.

From the foregoing, it is seen that the present invention provides a reclosable container which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A reclosable container comprising a bottom wall, a plurality of side walls upstanding from said bottom wall extending about the periphery thereof, an inner top wall across the upper ends of said side walls, an outer top wall adhesively secured on the exterior of said inner top wall, a pair of spaced retainers projecting from said outer top wall generally coplanar therewith beyond the adjacent side wall, a tab extending from said outer top wall between said retainers and hingedly connected to said top wall for swinging movement through the space between said retainers, said top wall being formed with severance lines extending inwardly from opposite sides of said tab, the top wall portion between said severance lines defining a closure openable upon severance of said severance lines for swinging out of the plane of said top wall, said tab being movable with said closure, and wings on said tab for movement therewith into and out of retaining engagement beneath said retainers.

2. A reclosable container according to claim 1, the inner top wall portion underlying said closure being unsecured thereto and having additional severance lines for removal of said underlying portion.

3. A reclosable container according to claim 2, said underlying portion defining a removable token.

4. A reclosable container according to claim 2, said additional severance lines being laterally spaced inward of said first-mentioned severance lines for lateral extension of said closure outward beyond said underlying portion, the laterally extending portions of said closure being unsecured to the inner top wall for overlapping closing relation therewith.

5. A reclosable container according to claim 1, said tab being hingedly connected to said outer top wall at a location inward of the projecting ends of said retainers, for swinging movement of said wings into and out of said retaining engagement beneath said retainers.

6. A reclosable container according to claim 1, in combination with an additional tab extending from said inner top wall and secured to the adjacent side wall beneath said first-mentioned tab, said first tab being detachably secured in overlying relation with said additional tab.

7. A reclosable container according to claim 4, in combination with an additional tab extending from the upper end of said adjacent side wall and secured beneath said inner top wall.

8. A reclosable container according to claim 7, said additional tab underlying said inner top wall portion and having severance lines for detachment with removal of said inner top wall portion.

9. A reclosable container according to claim 7, in combination with an additional tab extending from said inner top wall and secured to the adjacent side wall beneath said first-mentioned tab, said first tab being detachably secured in overlying relation with said additional tab.

10. A blank for a reclosable container, said blank comprising a plurality of side wall panels hingedly connected together in side-by-side relation, a pair of bottom wall panels hingedly connected to an alternate pair of said side wall panels at one end thereof, a pair of inner and outer top wall panels hingedly connected to said alternate side wall panels at the other end thereof, a pair of spaced lips projecting from one end of said outer top wall panel, a tab hingedly connected to and extending from said one end of said outer top wall panel between said lips, and a pair of wings on said tab outward of respective lips, said top wall panel being formed with severance lines extending inwardly from opposite sides of said tab, and said inner top wall panel having a portion adjacent to one end thereof formed with additional severance lines for removal of said portion.

11. A blank according to claim 10, said inner top wall panel portion having a nonadherent coating.

12. A blank according to claim 10, said one end of said inner and outer top wall panels being adjacent to each other.

13. A blank according to claim 10, said one end of said inner and outer top wall panels being remote from each other.

14. A blank according to claim 10, in combination with an additional tab extending hingedly from an end of a remaining side wall panel adjacent to said one end of said outer top wall panel, for securement to said inner top wall panel.

15. A blank according to claim 10, in combination with an additional tab extending hingedly from said one end of said inner top wall panel for securement to the adjacent remaining side wall panel.

16. A reclosable container comprising a bottom wall, a plurality of side walls upstanding from said bottom wall extending about the periphery thereof, an inner top wall across the upper ends of said side walls, an outer top wall adhesively secured on the exterior of said inner top wall, a first tab extending from and hingedly connected to said outer top wall, a second tab extending from said inner top wall and secured to the adjacent side wall beneath said first tab, said first tab being detachably secured in overlying relation with said second tab, said outer top wall being formed with severance lines extending inwardly from opposite sides of said tab, the outer top wall portion between said severance lines defining a closure openable upon severance of said severance lines for swinging out of the plane of said top wall, and said first tab being movable with said closure, the inner top wall portion underlying said closure being unsecured thereto and having additional severance lines for removal of said underlying portion, in combination with an inwardly extending catch on said first tab and engageable beneath said second tab for locking said closure against swinging.

17. A reclosable container according to claim 16, said additional severance lines being laterally spaced inward of said first mentioned severance lines for lateral extension of said closure outward beyond said underlying portion, the laterally extending portions of said closure being unsecured to the inner top wall for overlapping closing relation therewith.

18. A reclosable container according to claim 16, said first tab being formed with a generally U-shaped cut defining therewithin said catch.

References Cited
UNITED STATES PATENTS

| Re. 25,449 | 9/1963 | Gill | 229—17 |
| 2,358,923 | 9/1944 | Guyer | 229—45 |
| 2,812,126 | 11/1957 | Graybill | 229—17 |
| 2,812,127 | 11/1957 | Graybill | 229—17 |
| 3,096,922 | 7/1963 | Graybill | 229—17 |
| 3,187,978 | 6/1965 | Graybill | 229—17 |
| 3,270,941 | 9/1966 | Barnes | 229—17 |

JOSEPH R. LECLAIR, *Primary Examiner.*

DAVIS T. MOORHEAD, *Examiner.*